UNITED STATES PATENT OFFICE 2,363,505

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application October 26, 1942, Serial No. 463,439

5 Claims. (Cl. 252—334)

This invention relates to the treatment of petroleum emulsions, and has for its main object, to provide a novel process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned is of significant value in removing impurities, particularly inorganic salts from pipe line oil.

Briefly described, our process consists in subjecting a petroleum emulsion of the water-in-oil type, to the action of a demulsifying agent consisting of certain amido pyridinium salts of green petroleum sulfonic acids.

It is well known that one can prepare a variety of amido pyridinium compounds, characterized by the following formula:

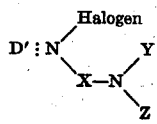

in which D':N represents a radical derived from a heterocyclic compound of the pyridine series, consisting of pyridine, quinoline, isoquinoline, and C-methyl linked homologues thereof; and X is a divalent aliphatic radical; and Y is an acyl radical, a hydrocarbon radical having not over 22 carbon atoms, an alkylol radical, or a hydroxylated aliphatic ether radical, and Z is the same as Y or a hydrogen atom, with the added proviso that there must be an acyl radical directly linked to the trivalent nitrogen atom; and that there must be present at least one hydrocarbon radical containing at least 8 carbon atoms and not more than 32 carbon atoms, as an integral part of at least one of the radicals directly linked to the trivalent nitrogen atom. As illustrations, reference is made to the following species:

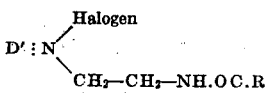

in which the acyl radical R.CO is derived from a monocarboxy detergent-forming acid having at least 8 and not more than 32 carbon atoms, and D':N represents a radical derived from a heterocyclic compound of the pyridine series consisting of pyridine, quinoline, isoquinoline, and C-methyl homologues thereof. (See U. S. Patent No. 2,273,181, dated February 17, 1942, to De Groote & Keiser, claim 1.)

$$D':N\diagup^{X}_{\diagdown CH_2-NH.OC.R}$$

in which the acyl radical RCO is derived from a monocarboxy detergent-forming acid having at least 8 and not more than 32 carbon atoms; and D':N represents a heterocyclic compound of the pyridine series, consisting of pyridine, quinoline, isoquinoline, and C-methyl homologues thereof; and X stands for the monovalent anion of an acid. (See U. S. Patent No. 2,290,417, dated July 21, 1942, to De Groote and Keiser, claim 1.)

$$D':N\diagup^{Halogen}_{\diagdown CH_2-CH_2-NT.OC.R}$$

in which T is a member of the class consisting of hydroxyethyl radicals, alkyl radicals, aryl radicals, aralkyl radicals, and alicyclic radicals having not more than 22 carbon atoms; the acyl radical RCO is derived from a monocarboxy detergent-forming acid having at least 8 and not more than 32 carbon atoms; and D':N represents a heterocyclic compound of the pyridine series consisting of pyridine, quinoline, isoquinoline, and C-methyl homologues thereof. (See our copending application Serial No. 415,763, filed October 20, 1941, now U. S. Patent No 2,329,700, dated September 21, 1943, claim 1.)

$$D':N\diagup^{Halogen}_{\diagdown CH_2-\underset{T'}{\overset{T'}{C}}-NT.OC.R}$$

in which T is a member of the class consisting of hydrogen atoms and hydroxyethyl radicals, and T" is a member of the class consisting of methyl radicals, ethyl radicals, and hydroxymethyl radicals, with the proviso that at least one occurrence of T" is a radical of the kind designated, and differentiated from a hydrogen atom; RCO is an acyl radical derived from a monocarboxy detergent-forming acid having at least 8 and not more than 32 carbon atoms; and D':N represents a heterocyclic compound of the pyridine series consisting of pyridine, quinoline, isoquinoline, and C-linked methyl homologues thereof. (See our co-pending application Serial No. 415,764, filed October 20, 1941, now U. S. Patent No. 2,329,701, dated September 21, 1943, claim 1.)

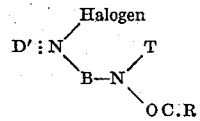

in which B is a divalent aliphatic radical, containing at least one and less than 15 ether linkages; and T is a member of the class consisting of alkyl radicals; aryl radicals; aralkyl radicals; alicyclic radicals; said hydrocarbon radicals having not more than 22 carbon atoms; hydroxylated aliphatic ether radicals of the type B.OH, where B has its previous significance; and hydroxyethyl radicals; and R.CO denotes a radical derived from a detergent-forming monocarboxy acid having at least 8 and not more than 32 carbon atoms; and D':N represents a heterocyclic compound of the pyridine series consisting of pyridine, quinoline, isoquinoline, and C-linked methyl homologues thereof. (See our copending application Serial No. 415,765, filed October 20, 1941, now U. S. Patent No. 2,329,-702, dated September 21, 1943, claim 1.)

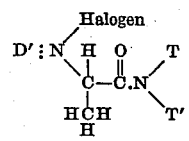

wherein T is a hydrocarbon radical having at least 8 and not more than 32 carbon atoms, and T' is a member of the class consisting of hydrogen atoms, hydrocarbon radicals having less than 8 carbon atoms, and hydrocarbon radicals having at least 8 and not more than 32 carbon atoms; and D':N represents a heterocyclic compound of the pyridine series consisting of pyridine, quinoline, isoquinoline, and C-linked methyl homologues thereof. (See our co-pending application Serial No. 415,766, filed October 20, 1941, now U. S. Patent No. 2,329,703, dated September 21, 1943, claim 1.)

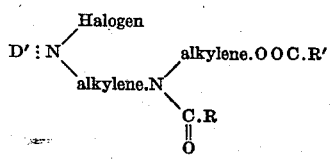

in which RCO is the acyl radical of a low molal monocarboxy acid having 5 carbon atoms or less, and R'CO is the acyl radical of a detergent-forming monocarboxy acid having at least 18 and not more than 32 carbon atoms; and D':N represents a heterocyclic compound of the pyridine series consisting of pyridine, quinoline, isoquinoline, and C-linked methyl homologues thereof. (See our co-pending application Serial No. 419,082, filed November 14, 1941, now U. S. Patent No. 2,335,262, dated November 30, 1943, claim 1.)

The manufacture of the compounds above described may be illustrated by the following reactions:

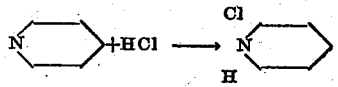

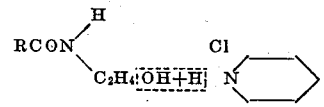

It is to be noted that the halogen atom previously depicted could equally well be the anion of any strong acid, particularly a monobasic acid, such as a sulfonic acid. In other words, such sulfonic acid could be used to neutralize pyridine in the same way as hydrochloric acid or some other halogen acid is employed. In the present instance, oil-soluble green petroleum sulfonic acids are employed in such a manner that the halogen in the formula previously presented in replaced by the radical DSO₃ derived from an oil-insoluble green petroleum sulfonic acid. In other words, the previously mentioned formula is suitably rewritten as follows:

$$\underset{X-N\diagdown Z}{\overset{D.SO_3}{D':N\diagdown Y}}$$

Specifically, then, the compounds herein contemplated may be indicated by the following illustrations:

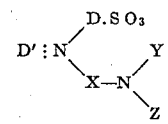

in which the acyl radical R.CO is derived from a monocarboxy detergent-forming acid having at least 8 and not more than 32 carbon atoms, and D':N represents a radical derived from a heterocyclic compound of the pyridine series consisting of pyridine, quinoline, isoquinoline, and C-methyl homologues thereof; and DSO₃ is an oil-insoluble green petroleum sulfonic acid radical.

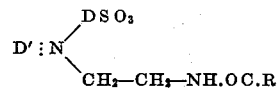

in which the acyl radical RCO is derived from a monocarboxy detergent-forming acid having at least 8 and not more than 32 carbon atoms; and D':N represents a heterocyclic compound of the pyridine series, consisting of pyridine, quinoline, isoquinoline, and C-methyl homologues thereof; and DSO₃ is an oil-soluble green petroleum sulfonic acid radical.

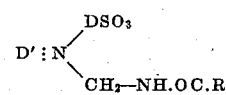

in which T is a member of the class consisting of hydroxyethyl radicals, alkyl radicals, aryl radicals, aralkyl radicals, and alicyclic radicals having not more than 22 carbon atoms; the acyl radical RCO is derived from a monocarboxy detergent-forming acid having at least 8 and not more than 32 carbon atoms; and D':N represents a heterocyclic compound of the pyridine series consisting of pyridine, quinoline, isoquinoline, and C-methyl homologues thereof; and DSO₃ is an oil-insoluble green petroleum sulfonic acid radical.

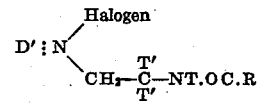

in which T is a member of the class consisting of hydrogen atoms and hydroxyethyl radicals, and T' is a member of the class consisting of methyl radicals, ethyl radicals, and hydroxymethyl radicals, with the proviso that at least one occurrence of T' is a radical of the kind designated, and differentiated from a hydrogen atom; RCO is an acyl radical derived from a monocarboxy detergent-forming acid having at least 8 and not more than 32 carbon atoms; and D':N represents a heterocyclic compound of the pyridine series consisting of pyridine, quinoline, isoquinoline, and C-linked methyl homologues thereof; and DSO$_3$ is an oil-insoluble green petroleum sulfonic acid radical.

$$D':N \diagup\begin{matrix}DSO_3\\ \\B-N\end{matrix}\diagdown\begin{matrix}\\T\\ \\OC.R\end{matrix}$$

in which B is a divalent aliphatic radical, containing at least one and less than 15 ether linkages; and T is a member of the class consisting of alkyl radicals; aryl radicals; aralkyl radicals; alicyclic radicals; said hydrocarbon radicals having not more than 22 carbon atoms; hydroxylated aliphatic ether radicals of the type B.OH, where B has its previous significance; and hydroxyethyl radicals; and R.CO denotes a radical derived from a detergent-forming monocarboxy acid having at least 8 and not more than 32 carbon atoms; and D':N represents a heterocyclic compound of the pyridine series consisting of pyridine, quinoline, isoquinoline, and C-linked methyl homologues thereof; and DSO$_3$ is an oil-insoluble green petroleum sulfonic acid radical.

$$D':N\diagup\begin{matrix}Halogen\\H\ \ O\\ |\ \ \|\\C-C.N\\|\\HCH\\H\end{matrix}\diagdown\begin{matrix}\\T\\ \\ \\T'\end{matrix}$$

wherein T is a hydrocarbon radical having at least 8 and not more than 32 carbon atoms, and T' is a member of the class consisting of hydrogen atoms, hydrocarbon radicals having less than 8 carbon atoms, and hydrocarbon radicals having at least 8 and not more than 32 carbon atoms; and D':N represents a heterocyclic compound of the pyridine series consisting of pyridine, quinoline, isoquinoline, and C-linked methyl homologues thereof; and DSO$_3$ is an oil-insoluble green petroleum sulfonic acid radical.

$$D':N\diagup\begin{matrix}DSO_3\\ \\alkylene.N\end{matrix}\diagdown\begin{matrix}alkylene.OOC.R'\\ \\C.R\\\|\\O\end{matrix}$$

in which RCO is the acyl radical of a low molal monocarboxy acid having 5 carbon atoms or less, and R'CO is the acyl radical of a detergent-forming monocarboxy acid having at least 18 and not more than 32 carbon atoms; and D':N represents a heterocyclic compound of the pyridine series consisting of pyridine, quinoline, isoquinoline, and C-linked methyl homologues thereof; and DSO$_3$ is an oil-insoluble green petroleum sulfonic acid radical.

As previously stated, the manufacture of these compounds represents nothing more than following the same procedure referred to in the preceding patent and the aforementioned co-pending applications and patents, except that instead of neutralizing pyridine or a similar compound with hydrochloric acid or the equivalent, one employs a water-soluble petroleum sulfonic acid, of the green acid type, as herein described. Such green petroleum acids may be obtained from paraffin type crudes, or naphthene type crudes, or from asphaltic type crudes, or mixed type crudes. It is understood that all the various reactants referred to in the above patent and the aforementioned co-pending applications may be used; and this statement applies with the same force and effect as if they were repeated in detail here. It is also obvious that compounds can be obtained by double decomposition, for instance, reacting the pyridinium chloride with a sodium sulfonate in alcoholic solution, so as to precipitate sodium chloride.

For the sake of brevity, reference will immediately be made to the manufacture of the water-soluble petroleum sulfonic acids which may be employed.

As has been previously pointed out, the compounds herein contemplated are derivatives of the water-soluble type of petroleum sulfonic acid, commonly known as green acids. Petroleum sulfonic acids are produced from a wide variety of petroleum distillates or petroleum fractions, and in some instances, they are produced from the crude petroleum itself. When produced from crude petroleum itself, it is customary to use crude oil of the naphthenic type, crude oil of the paraffin type, crude oil of the asphaltic type, and mixtures of said three different types of crude oil.

The art of refining crude petroleum or various fractions, using sulfuric acid of various strengths, as well as monohydrate and fuming acid, is a well known procedure. In such conventional refining procedure, petroleum sulfonic acids have been produced as by-products. For instance, in removing the olefinic components, it has been common practice to use sulfuric acid so as to polymerize the olefines or convert them into sulfonic acids which are subsequently removed. Likewise, in the production of white oil, or highly refined lubricating oils, it has been customary to treat with fuming sulfuric acid, so as to eliminate certain undesirable components.

In recent years, certain mineral oil fractions have been treated with sulfuric acid with the primary object of producing petroleum sulfonic acids, and in such procedure, the petroleum sulfonic acids represented the primary products of reaction, rather than concomitant by-products.

Petroleum sulfonic acid, regardless of whether derived as the principal product of reaction or as a by-product, can be divided into two general products, to wit, green acid or acids and mahogany acid or acids. The green acids are characterized by being water-soluble or dispersible. In other words, they form either true solutions or sols. For purpose of convenience, they will be herein referred to as water-soluble, without any effort to indicate whether the solution is molecular or colloidal in nature. The green acids, as indicated by their name, frequently give an aqueous solution having a dark green or gray-green appearance. They generally appear as a component of the acid draw-off, and do not remain behind dissolved in the oil fraction which has been subjected to sulfuric acid treatment. The green acids are not soluble in oil, even when substantially anhydrous, and certainly are not soluble in oil when they contain as much as 15% of water. Similarly, their salts obtained by neutralizing the green acids with a strong solution of caustic soda, caustic potash, or ammonia, are not oil-soluble. For convenience of classification, the ammonium salt will be considered as an alkali salt.

In contradistinction to the hydrophile green acids, there occurs, as in the manufacture of medicinal white oil, the oil-soluble type of the mahogany acids. These mahogany acids are characterized by being soluble in oil, especially when anhydrous, and being soluble in oil, even if they contain some dissolved water. Some of the mahogany acids also show limited hydrophilic properties to the extent that either some water can be dissolved in the acids, or they, in turn, may dissolve to some extent in water. In some instances, their salts, such as the sodium, ammonium, or potassium salt, will dissolve in water to give a colloidal sol. However, regardless of the presence of any hydrophilic properties whatsoever, they always have a characteristic hydrophobe property, as indicated by the fact that the substantially anhydrous form, for instance, their alkali salts containing 5–12% water, will dissolve in oil. This clearly distinguishes them from the green acids previously referred to, because the green acids in similar form containing the same amount of water, for example, will not dissolve in oil. The green acids, as such, are essentially hydrophilic and non-hydrophobic in character.

As is previously indicated, we have found that if green acids of the oil-insoluble type are converted into amido pyridinium salts, of the kind herein described, the resulting product has pronounced value as a demulsifier for oil field emulsions of the water-in-oil type, either when used alone, or in conjunction with other compatible and well known demulsifying agents.

The hydrosulfonate employed is conveniently obtained by neutralizing the pyridine bases with green petroleum acids. As to methods of preparing the green petroleum acids, the following examples are included in order to illustrate the various types which may be employed:

Example A

Green acids are obtained from Gulf Coast lubricating oil distillate having an S. U. viscosity at 150° F. of about 400 seconds. The procedure employed in obtaining such green acids is that described in U. S. Patent No. 2,188,770, dated January 30, 1940, to Robertson. The material so obtained contains considerable moisture and is preferably dehydrated to the point where the moisture content is not over 15%. After such procedure, hereinafter described, the sulfonic acid is neutralized with caustic soda and completely dehydrated.

Example B

The same procedure is followed as in Example A, but instead, the green acids are obtained from Gulf Coast transformer oil extract in the manner described in U. S. Patent No. 2,203,443, dated June 4, 1940, to Ross and Mitchell.

Example C

The same procedure is followed as in Example B, except that California 65 Saybolt viscosity Edeleanu extract is employed instead of Gulf Coast transformer Edeleanu extract employed in Example B.

Example D

The same procedure is followed as in Example A, except that the product is made from a Gulf Coast naphthene type crude, preferably of the kind which has little or no low boiling fraction, i. e., the kind which, on a straight run distillation, gives little or no gasoline.

In the following examples it will be noted that they are substantially in verbatim form as they appear in the aforementioned patents and co-pending applications, except that one mole of a green petroleum sulfonic acid is substituted for hydrochloric acid or its equivalent and certain other modifications may be required in the light of changed solubilities.

For the sake of convenience, a green sulfonic acid typified by Example A, preceding, and containing about 15% of water, is considered as having an apparent molecular weight of 350.

Example 1

500 g. of a fatty acid ethanolamide, obtained by reaction of split cocoanut oil (containing all the natural acids, beginning with the caprylic up to the stearic acid, and some oleic acid) with monoethanolamine, 630 g. hydrosulfonate of a fraction of pyridine bases (50% distilling up to 140° C., 90% distilling up to 160° C., completely soluble in water) and 100 g. of the mixture of the free pyridine bases, are heated at 100° C., or even higher, for one-half to five hours.

When working at 150–160° C., the reaction is more rapid.

Furthermore, pure pyridine may be used instead of a mixture of pyridine bases. (Compare with Example 2 of Haack Patent No. 2,242,211.)

The hydrosulfonate employed is conveniently obtained by neutralizing the pyridine bases with a green sulfonic acid of the kind described immediately preceding. (Compare also with Example 1 of U. S. Patent No. 2,273,181.)

Example 2

One pound mole of octyllactamide (derived by reaction between octylamine and ethyl lactate) is reacted with 1.1 pound moles of pyridine hydrosulfonate in the presence of one-twentieth of a mole of free pyridine. The reaction is conducted at approximately 150–160° C., until the substituted lactamide has been converted into the quaternary compound. This reaction is complete in a comparatively short time, in some instances less than one hour, although in other instances three or four hours may be required. If desired, the reaction may be conducted at a slightly higher temperature, for instance, as high as 180° C. Instead of using pyridine hydrosulfonate, one may employ the hydrosulfonate of a fraction of pyridine bases of the kind that 50% will distil over at 140° C., or below, and 90% at 160° C., or below. Such selected pyridine bases are of the kind which are entirely water-soluble. The hydrosulfonate employed is obtained by neutralizing the pyridine bases with green sulfonic acid of the kind described previously. (Compare with our co-pending application Serial No. 415,766, filed October 20, 1941, now U. S. Patent No. 2,329,703, dated September 21, 1943.)

Example 3

12 parts of stearohydroxymethylamide, 24.2 parts of anhydrous pyridine hydrosulfonate, and 20 parts of pyridine are stirred together at 70–80° C. until a test sample of the reaction mixture indicates that the desired resolant has been obtained. The reaction mixture is then distilled at 60–70° C., under reduced pressure, to remove pyridine. The quaternary salt, stearamidomethylpyridinium hydrosulfonate, thus obtained, corresponds to the following formula:

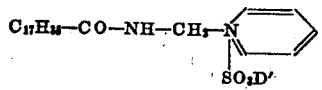

The hydrosulfonate employed is obtained by neutralizing the pyridine bases with the same green sulfonic acid as employed in previous examples. (See U. S. Patent No. 2,290,417, dated July 21, 1942, to De Groote and Keiser. See also Example 2 of U. S. Patent No. 2,146,392, to Baldwin et al.)

Example 4

570 grams of a fatty acid diethanolamide, obtained by reaction of split cocoanut oil (containing all the natural acids, beginning with the capric up to stearic, and some oleic), with diethanolamine, 710 g. of hydrosulfonate of a fraction of pyridine bases (50% distilling up to 140° C., 90% distilling up to 160, completely soluble in water), and 100 g. of the mixture of the free pyridine bases, are heated at 100° C. for about 4 hours.

When working at 150–160°, the reaction is more rapid.

Furthermore, pure pyridine may be used instead of a mixture of pyridine bases. (Compare with Example 2 of the aforementioned Haack Patent No. 2,242,211.)

The hydrosulfonate employed is obtained by neutralizing the pyridine bases with the same green sulfonic acid as employed in previous examples. (Compare also with our co-pending application Serial No. 415,763, filed October 20, 1941, now U. S. Patent No. 2,329,700, dated September 21, 1943.

Example 5

360 g. of a fatty acid amide, obtained by reaction of split cocoanut oil (containing all the natural acids, beginning with the capric up to the stearic acid, and some oleic acid) with tris(hydroxymethyl)aminomethane, 429 g. hydrosulfonate of a fraction of pyridine bases (50% distilling up to 140° C., 90% distilling up to 160° C., completely soluble in water) and 100 g. of the mixture of the free pyridine bases, are heated at 100° C. for about five hours.

The hydrosulfonate employed is obtained by neutralizing the pyridine bases with the same green sulfonic acid as employed in previous examples. (Compare with our co-pending application Serial No. 415,764, filed October 20, 1941, now U. S. Patent No. 2,329,701, dated September 21, 1943, Example 1.)

Example 6

One pound mole of the amide derived from mixed cocoanut oil is reacted with 4 pound moles of ethylene oxide to give an amide corresponding to the following formula wherein R.CO represents the acyl radical of the mixed cocoanut oil fatty acids, $RCON(C_2H_4OC_2H_4OH)_2$. One pound mole of such raw material is reacted with one pound mole of pyridine hydrosulfonate at approximately 150–160° C. in the presence of a slight amount of pure pyridine. Reaction is continued until complete, as indicated by the absence of the initial reactants. Instead of pure pyridine, a mixture of pyridine bases, for instance, 50% distilling up to 140° C., and 90% distilling at 160° C., and completely soluble in water, may be employed as a reactant. The hydrosulfonate employed is obtained by neutralizing the pyridine bases with the same green sulfonic acid as employed in previous examples. (Compare with Example 2 of the aforementioned Haack Patent No. 2,242,211. Compare also with our co-pending application Serial No. 415,765, filed October 20, 1941, now U. S. Patent No. 2,329,702, dated September 21, 1943.)

Example 7

One pound mole of the esteramide derived by reaction between equimolar portions of bis(hydroxyethyl)acetamide and ricinoleic acid is heated with 1.05 moles of pyridine hydrosulfonate at 140–150° C. The time required is generally less than one hour, and the reaction is hastened by the presence of a small amount, 1% or 2%, of free pyridine. If desired, the reaction may be conducted at a slightly higher temperature, for instance, 160–170° C. Instead of using pyridine hydrosulfonate, one may employ the hydrosulfonate of a fraction of pyridine bases, of the kind that 50% would distil over 140° C., or below, and 90% at 160° C. or below. Such selected pyridine bases are of the kind which are entirely water-soluble. The hydrosulfonate employed is obtained by neutralizing the pyridine bases with the same green sulfonic acid as employed in previous examples. (Compare with our co-pending application Serial No. 419,082, filed November 14, 1941, now U. S. Patent No. 2,335,262, dated November 30, 1943, Example 1.)

Example 8

The same procedure is followed as in Examples 1–7, preceding, except that instead of employing a green sulfonic acid of the kind exemplified by Example A, preceding, one employs a green sulfonic acid of the kind employed by Example B, C, or D, preceding.

The general method of manufacture is obvious, in view of what is said in the aforementioned patents and the aforementioned co-pending applications, and also in the light of the above illustrations. Generally speaking, the convenient procedure is as follows:

(a) Prepare a suitable oil-insoluble green sulfonic acid, for instance, the kind illustrated in Example A, preceding, and most preferably, in anhydrous, or substantially anhydrous, form. If too viscous for apparatus available, or in any instance, dilute conveniently with a high boiling solvent.

(b) Neutralize pyridine or a selected pyridine base with such sulfonic acid, using equivalent molal proportions.

(c) Obtain a high molal amide of any one of the types previously suggested, for instance, amides derived from a high molal monocarboxy detergent-forming acid and a hydroxylated primary or secondary amine; or an amide derived from a low molal hydroxy acid, particularly lactic acid, and an amine such as octadecylamine, or a hydroxylated amide of a low molal non-hydroxy acid, such as acetic acid, and esterify the hydroxyethyl group or the like with a high molal acid.

(d) React one mole of the hydroxylated amide with one mole of the pyridinium hydrosulfonate for approximately one-half to five hours at approximately 160–200° C. temperature.

(e) If the reaction does not take place smoothly and without difficulty, it can frequently be hastened by the presence of some of the free base, for instance, an amount of the free base equivalent to 5-25% of the amount present as the hydrosulfonate.

(f) If the pyridine hydrosulfonate is water-soluble, and if the hydroxylated amide is water-soluble, or forms a colloidal sol, then if reaction results in an insoluble product, the very formation of such product indicates completeness of reaction. However, this index is not entirely satisfactory for a number of reasons. In the first place, the pyridine hydrosulfonate may not be water-soluble to any marked degree. In the second place, the pyridine hydrosulfonate may be obtained from a sulfonic acid which has present some inert high boiling solvent which imparts water-insolubility to the mixture. Finally, even though the reaction involved produces an insoluble product, the presence of either reactant in slight excess may act as a peptizing agent and produce a solution or sol. Similarly, there may be present an impurity which does not enter into the reaction at all, and yet acts as a peptizing agent and produces a solution under conditions which would ordinarily suggest formation of an insoluble precipitate.

For this reason, completeness of reaction is best predicated upon other tests. If the reaction time is continued from two to five hours, and particularly, if the longer period is employed at a temperature of 180°–200° C., reaction is generally complete. Secondly, if the reaction mass is purified, a molecular weight determination will show that reaction has taken place insofar that the molecular weight of the resultant is equal to the sum of the molecular weight of the two reactants.

A small amount of the reaction mass may be acidified with HCl so as to convert uncombined pyridine into the hydrochloride.

An acidic pyridine hydrochloride solution can be treated with caustic and pyridine liberated or determined in any suitable manner. The amount of pyridine remaining in the reaction mass is an index, of course, to the degree to which the reaction has taken place.

Instead of using the above procedure, one may use the method of double decomposition. This depends on forming the pyridinium hydrochloride, not the hydrosulfonate, and obtaining the quaternary compound in the chloride or equivalent form, as described in aforementioned U. S. Patent No. 2,273,181, and also in the various aforementioned copending applications. Having obtained the quaternary chloride or equivalent, if it is water-soluble, then one need only prepare an aqueous solution. Similarly, one prepares an aqueous solution of the selected green sulfonic acid salt, for instance, the sodium, ammonium, or potassium salt, of a green acid of the kind illustrated by Example A, preceding. These two aqueous solutions are mixed in molar proportions. A precipitate is formed and sodium chloride or potassium chloride or ammonium chloride passes into the water phase and can be discarded. Here again, precaution must be taken that the mixture of the two reactions, or rather, that the resultant is not rendered water-soluble by peptizing action, as previously described.

Another satisfactory procedure is to use the double decomposition method by employing anhydrous materials dissolved in absolute alcohol or its equivalent. When the two solutions are mixed, sodium chloride is precipitated and the resultant stays dissolved in the alcohol. Filtration or decantation can be employed to remove the insoluble salt such as sodium chloride and the alcohol can be evaporated from the resultant and re-used in further manufacture.

It is to be noted that the various reactants employed for producing compounds of the kind herein contemplated include the following: Monocarboxy detergent-forming acids; high molal amines; hydroxylated primary and secondary amines; low molal hydroxy acids, such as lactic acid; non-hydroxylated low molal acids, such as acetic acid, butyric acid, etc., having less than 8 carbon atoms; aldehydes, and particularly, formaldehyde (the aldehydes can be used to react with high molal acid amides, such as stearamide, to produce a hydroxymethyl stearamide).

It is well known that certain monocarboxy organic acids containing eight carbon atoms or more, and not more than 32 carbon atoms, are characterized by the fact that they combine with alkalies to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occuring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

The low molal non-hydroxy monocarboxy acids include acetic acid, propionic acid, butyric acid, valeric acid, etc.

Hydroxyalkyl ether radicals may be obtained from oxyalkylated amides. For instance, a high molal carboxy acid or its functional equivalent, such as the ester, acyl chloride, anhydride, etc., may be reacted with a primary or secondary hydroxylated amine, such as monoethanolamine, diethanolamine, monopropanolamine, dipropanolamine, tris(hydroxymethyl) aminomethane, etc. The amide so obtained is treated with an oxyalkylating agent containing a reactive ethylene oxide ring, such as ethylene oxide, butylene oxide, glycid, etc. The amides derived from low molal acids can be similarly treated; for instance, the amides derived from lactic acid, acetic acid, etc.

Other suitable amines used as reactants for amidification include: 2-amino-1-butanol; 2-amino-2-methyl-1-propanol; 2-amino-2-methyl-1,3-propane diol; 2-amino-2-ethyl-1,3-propane diol; tris(hydroxymethyl)aminomethane.

Instead of using monoethanolamine, diethanolamine, or the like, one may use compounds such as amyl ethanolamine, cyclohexyl ethanolamine, benzyl ethanolamine, etc. In some instances, the amides are preferentially obtained by reacting the high molal acid, for instance, a higher fatty acid, with cyclohexylamine, amylamine, benzylamine, aniline, or the like, and then treating the amide with ethylene oxide or the like so as to introduce a hydroxyethyl group. As to the production of hydroxymethyl substituted amides, i. e., reactants suitable for combination with a pyridine hydrosulfonate, see U. S. Patent No. 2,125,901, dated August 9, 1938, to Evans et. al; and U. S. Patent No. 2,146,392, dated February 7, 1937, to Baldwin et al. The hydroxymethyl stearamides are obtained by use of formaldehyde as a reactant.

As to high molal amines which are suitable for reaction with lactic acid or the like, the latter supplying both the amido radical and the reactive hydroxyl, reference is made to U. S. Patent No. 2,246,842, dated June 24, 1941, to De Groote.

It is to be noted that that particular patent excludes arylamines; but it is understood that such compounds are not excluded in the present instance. For instance, naphthylamine, methyl naphthylamine, ethyl, naphthylamine, and the like, may be employed.

Furthermore, attention is directed to the fact that said aforementioned De Groote patent contemplates, inter alia, certain tertiary amines. Such amines, of course, are not herein contemplated as reactants, insofar that there is no reactive hydrogen atom available.

The primary amines which may be used as such or converted into secondary amines by conventional processes, such as treatment with methyl iodide, benzyl chloride, alkyl sulphates, or the like, include the following: Octadecenylamine; cetylamine; stearlyamine; oleoamine; ricinoleoamine; amines derived from naphthenic acids; amines derived from octadecadiene 9,11-acid-1; octadecylamine; amines derived from mixed unsaturated fatty acids, such as soyabean fatty acids; cottonseed oil fatty acids; linseed oil fatty acids; heptadecylamine, hexadecylamine; dodecylamine; decylamine, etc. The amines may be aliphatic, aralkyl, alicyclic, aryl, alkyl, etc.

One may also employ amines derived from acids obtained by oxidation of wax, paraffin, etc. Such acids may have as many as 32 carbon atoms. For instance, see U. S. Patent No. 2,242,837, dated May 20, 1941, to Shields. The following patents listed in the aforementioned De Groote Patent No. 2,246,842 are herein included as a matter of convenience indicating means of obtaining such high molal primary or secondary amines, or methods which can be obviously modified to produce the same: U. S. Patents Nos. 1,951,469, dated March 20, 1934, Bertsch; 2,006,058, dated June 25, 1935, Olin; 2,033,866, dated March 10, 1936, Schrauth; 2,074,830, dated March 23, 1937, Flett; 2,078,922, dated May 4, 1937, Arnold; 2,091,105, dated Aug. 24, 1937, Piggott; 2,108,147, dated Feb. 15, 1938, Speer; 2,110,199, dated March 8, 1938, Carothers; 2,132,902, dated Oct. 11, 1938, Lenher; 2,178,522, dated Oct. 31, 1938, Ralston; British Patents Nos. 359,001, of 1932, to Johnson; and 358,114, of 1932, to Carpmael.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

In practising our process, a treating agent or demulsifying agent of the kind above described is brought into contact with or caused to act upon the emulsion to be treated, in any one of the various ways, or by any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

It may be that some green sulfonic acids have more than one sulfonic acid radical. In such instances, at least one sulfonic acid radical would have to be neutralized with the amido pyridinium base herein described. The other sulfonic acid radical could be so neutralized, or neutralized with some other base, such as caustic soda, caustic potash, ammonium hydroxide, etc. For the sake of convenience, the hereto appended claims are concerned with monosulfonic acids and are conveniently presented by the following form, in order to show the electrovalent linkage:

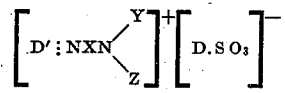

in which the various characters have their previous significance. The new material or compound herein described, forms the subject-matter of our divisional application Serial No. 500,721, filed August 30, 1943.

Having thus described our invention, what we claim as new and desire to secure by Letters Patent is:

1. A process for breaking petroleum emulsions of the water-in-oil type, characterized by subjecting the emulsion to the action of a demulsifying agent containing the salt of an amido pyridinium base; said amido pyridinium base salt being obtained from an oil-insoluble green petroleum sulfonic acid; and the amido pyridinium base cation being of the following formula:

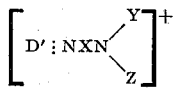

in which D':N represents a radical derived from a heterocyclic compound of the pyridine series, consisting of pyridine, quinoline, isoquinoline, and C-methyl linked homologues thereof; and X is a divalent aliphatic radical; and Y is a member of the class consisting of acyl radicals, hydrocarbon radicals having not over 22 carbon atoms, alkylol radicals, hydroxylated aliphatic ether radicals, acylated alkylol radicals, and acylated hydroxylated aliphatic ether radicals; Z is a member of the class consisting of hydrogen atoms, acyl radicals, hydrocarbon radicals having not over 22 carbon atoms, alkylol radicals, acylated alkylol radicals, hydroxylated aliphatic ether radicals, and acylated hydroxylated aliphatic ether radicals; with the added proviso that there must be an acyl radical directly linked to the trivalent nitrogen atom; and there must be present at least one hydrocarbon radical containing at least 8 and not more than 32 carbon atoms as an integral part of at least one of the radicals linked to the trivalent nitrogen atom.

2. A process for breaking petroleum emulsions of the water-in-oil type, characterized by subjecting the emulsion to the action of a demulsifying agent containing the salt of an amido pyridinium base; said amido pyridinium base salt being obtained from an oil-insoluble green petroleum sulfonic acid; and the amido pyridinium base cation being of the following formula:

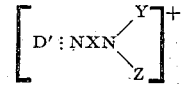

in which D':N represents a radical derived from a heterocyclic compound of the pyridine series, consisting of pyridine, quinoline, isoquinoline, and C-methyl linked homologues thereof; and X is a divalent aliphatic radical; and Y is a member of the class consisting of acyl radical, hydrocarbon radicals having not over 22 carbon atoms, alkylol radicals, hydroxylated aliphatic ether radicals, acylated alkylol radicals, and acylated hydroxylated aliphatic ether radicals; and Z is a member of the class consisting of hydrogen atoms, acyl radicals, hydrocarbon radicals having not over 22 carbon atoms, alkylol radicals, hydroxylated aliphatic ether radicals, acylated alkylol radicals, and acylated hydroxylated aliphatic ether radicals; with the added proviso that there must be an acyl radical linked to the trivalent nitrogen atom, and there must be present at least one hydrocarbon radical containing at least 8 and not more than 32 carbon atoms as an integral part of at least one of the radicals linked to the trivalent nitrogen atom.

3. A process for breaking petroleum emulsions of the water-in-oil type, characterized by subjecting the emulsion to the action of a demulsifying agent containing the salt of an amido pyridinium base; said amido pyridinium base salt being obtained from an oil-insoluble green petroleum sulfonic acid derived from a naphthene type crude; and the amido pyridinium base cation being of the following formula:

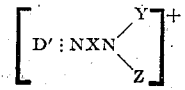

in which D':N represents a radical derived from a heterocyclic compound of the pyridinium series, consisting of pyridine, quinoline, isoquinoline, and C-methyl linked homologues thereof; and X is a divalent aliphatic radical; and Y is a member of the class consisting of acyl radicals, hydrocarbon radicals having not over 22 carbon atoms, alkylol radicals, hydroxylated aliphatic ether radicals, acylated alkylol radicals, and acylated hydroxylated aliphatic ether radicals; and Z is a member of the class consisting of hydrogen atoms, acyl radicals, hydrocarbon radicals having not over 22 carbon atoms, alkylol radicals, hydroxylated aliphatic ether radicals, acylated alkylol radicals, and acylated hydroxylated aliphatic ether radicals; with the added proviso that there must be an acyl radical linked to the trivalent nitrogen atom, and there must be present at least one hydrocarbon radical containing at least 8 and not more than 32 carbon atoms as an integral part of at least one of the radicals linked to the trivalent nitrogen atom.

4. A process for breaking petroleum emulsions of the water-in-oil type, characterized by subjecting the emulsion to the action of a demulsifying agent containing the salt of an amido pyridinium base; said amido pyridinium base salt being obtained from an oil-insoluble green petroleum sulfonic acid derived from a paraffin type crude; and the amido pyridinium base cation being of the following formula:

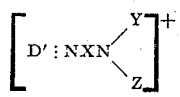

in which D':N represents a radical derived from a heterocyclic compound of the pyridine series, consisting of pyridine, quinoline, isoquinoline, and C-methyl linked homologues thereof; and X is a divalent aliphatic radical; and Y is a member of the class consisting of acyl radicals, hydrocarbon radicals having not over 22 carbon atoms, alkylol radicals, hydroxylated aliphatic ether radicals, acylated alkylol radicals, and acylated hydroxylated aliphatic ether radicals; and Z is a member of the class consisting of hydrogen atoms, acyl radicals, hydrocarbon radicals having not over 22 carbon atoms, alkylol radicals, hydroxylated aliphatic ether radicals, acylated alkylol radicals, and acylated hydroxylated aliphatic ether radicals; with the added proviso that there must be an acyl radical linked to the trivalent nitrogen atom, and there must be present at least one hydrocarbon radical containing at least 8 and not more than 32 carbon atoms as an integral part of at least one of the radicals linked to the trivalent nitrogen atom.

5. A process for breaking petroleum emulsions of the water-in-oil type, characterized by subjecting the emulsion to the action of a demulsifying agent containing the salt of an amido pyridinium base; said amido pyridinium base salt being obtained from an oil-insoluble green petroleum sulfonic acid derived from an asphaltic type crude; and the amido pyridinium base cation being of the following formula:

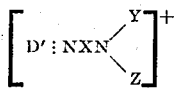

in which D':N represents a radical derived from a heterocyclic compound of the pyridine series, consisting of pyridine, quinoline, isoquinoline, and C-methyl linked homologues thereof; and X is a divalent aliphatic radical; and Y is a member of the class consisting of acyl radicals, hydrocarbon radicals having not over 22 carbon atoms, alkylol radicals, hydroxylated aliphatic ether radicals, acylated alkylol radicals, and acylated hydroxylated aliphatic ether radicals; and Z is a member of the class consisting of hydrogen atoms, acyl radicals, hydrocarbon radicals having not over 22 carbon atoms, alkylol radicals, hydroxylated aliphatic ether radicals, acylated alkylol radicals, and acylated hydroxylated aliphatic ether radicals; with the added proviso that there must be an acyl radical linked to the trivalent nitrogen atom, and there must be present at least one hydrocarbon radical containing at least 8 and not more than 32 carbon atoms as an integral part of at least one of the radicals linked to the trivalent nitrogen atom.

MELVIN DE GROOTE.
BERNHARD KEISER.